(12) United States Patent
Suzuki et al.

(10) Patent No.: US 11,340,546 B2
(45) Date of Patent: May 24, 2022

(54) FUSER DEVICE

(71) Applicant: NOK CORPORATION, Tokyo (JP)

(72) Inventors: Masaya Suzuki, Fujisawa (JP); Kenji Sasaki, Fujisawa (JP); Wataru Nemoto, Fujisawa (JP); Hidetomo Mukai, Fujisawa (JP)

(73) Assignee: NOK CORPORATION

( * ) Notice: Subject to any disclaimer, the term of this patent is extended or adjusted under 35 U.S.C. 154(b) by 0 days.

(21) Appl. No.: 17/297,779

(22) PCT Filed: Dec. 27, 2019

(86) PCT No.: PCT/JP2019/051384
§ 371 (c)(1),
(2) Date: May 27, 2021

(87) PCT Pub. No.: WO2020/170609
PCT Pub. Date: Aug. 27, 2020

(65) Prior Publication Data
US 2022/0050408 A1 Feb. 17, 2022

(30) Foreign Application Priority Data

Feb. 18, 2019 (JP) .............................. JP2019-026438

(51) Int. Cl.
*G03G 15/20* (2006.01)

(52) U.S. Cl.
CPC ....... *G03G 15/206* (2013.01); *G03G 15/2053* (2013.01)

(58) Field of Classification Search
CPC ............. G03G 15/206; G03G 15/2053; G03G 15/2057
See application file for complete search history.

(56) References Cited

U.S. PATENT DOCUMENTS

| 5,253,024 A | 10/1993 | Okuda et al. |
| 6,215,975 B1 | 4/2001 | Berkes et al. |

(Continued)

FOREIGN PATENT DOCUMENTS

| EP | 372518 A2 | 6/1990 |
| EP | 1072961 A2 | 1/2001 |

(Continued)

OTHER PUBLICATIONS

International Search Report (English and Japanese) of the International Searching Authority issued in PCT/JP2019/051384, dated Mar. 10, 2020; ISA/JP (5 pages).

(Continued)

*Primary Examiner* — Sandra Brase
(74) *Attorney, Agent, or Firm* — Harness, Dickey & Pierce, P.L.C.

(57) ABSTRACT

A tubular fuser device rotates and is in contact with a sheet on which a positively charged toner image is formed to fix the toner image to the sheet. The fuser device includes a tubular substrate made of a metal, a rubber layer covering the outer periphery of the substrate, an adhesion layer covering the outer periphery of the rubber layer, and a surface layer made of a resin covering the outer periphery of the adhesion layer. In the fuser device, $C \cdot R/A^2$ is less than $1.1 \times 10^{-53}$ $F\Omega/cm^4$ in which $C \cdot R/A^2$ is a product of an electrostatic capacity per unit area $C/A$ in a thickness direction of the fuser device and an electrical resistance per unit area $R/A$ in the thickness direction of the fuser device.

9 Claims, 9 Drawing Sheets

(56) References Cited

U.S. PATENT DOCUMENTS

| | | | |
|---|---|---|---|
| 2009/0263168 A1* | 10/2009 | Baba | G03G 15/2053 |
| | | | 399/329 |
| 2013/0164060 A1 | 6/2013 | Honke et al. | |
| 2017/0277090 A1* | 9/2017 | Mukoyama | G03G 15/2057 |
| 2018/0136589 A1 | 5/2018 | Sakamoto et al. | |
| 2018/0239280 A1 | 8/2018 | Takagi | |

FOREIGN PATENT DOCUMENTS

| | | |
|---|---|---|
| EP | 3382457 A1 | 10/2018 |
| JP | H2154287 A | 6/1990 |
| JP | H11-316508 A | 11/1999 |
| JP | 2000-250345 A | 9/2000 |
| JP | 2001-056614 A | 2/2001 |
| JP | 2007-004051 A | 1/2007 |
| JP | 2013-130712 A | 7/2013 |
| JP | 2015-090469 A | 5/2015 |
| JP | 2015-121620 A | 7/2015 |
| JP | 2018-084815 A | 5/2018 |
| JP | 2018-136412 A | 8/2018 |

OTHER PUBLICATIONS

Notice of Reasons for Refusal for corresponding Japanese Application No. 2021-501651 dated Jul. 27, 2021, with English translation (10 pages).

\* cited by examiner

Fig. 12

| | | SAMPLE 1 | SAMPLE 2 | SAMPLE 3 | SAMPLE 4 | SAMPLE 5 | SAMPLE 6 |
|---|---|---|---|---|---|---|---|
| SLIDE LAYER 12 | MATERIAL | PTFE | PTFE | PTFE | PTFE | PTFE | PTFE |
| | THICKNESS (μm) | 12 | 12 | 12 | 12 | 12 | 12 |
| SUBSTRATE 11 | MATERIAL | NICKEL | NICKEL | NICKEL | NICKEL | NICKEL | NICKEL |
| | THICKNESS (μm) | 40 | 40 | 40 | 40 | 40 | 40 |
| PRIMER LAYER 13 | MATERIAL | SILICONE RUBBER-BASED | SILICONE RUBBER-BASED | SILICONE RUBBER-BASED | SILICONE RUBBER-BASED | SILICONE RUBBER-BASED | SILICONE RUBBER-BASED |
| | THICKNESS (μm) | 2 | 2 | 2 | 2 | 2 | 2 |
| RUBBER LAYER 14 | MATERIAL | NON-CONDUCTIVE SILICONE RUBBER | NON-CONDUCTIVE SILICONE RUBBER | NON-CONDUCTIVE SILICONE RUBBER | NON-CONDUCTIVE SILICONE RUBBER | NON-CONDUCTIVE SILICONE RUBBER | NON-CONDUCTIVE SILICONE RUBBER |
| | THICKNESS (μm) | 285 | 285 | 300 | 285 | 285 | 285 |
| ADHESION LAYER 15 | MATERIAL | NON-CONDUCTIVE FLUORORESIN-BASED | NON-CONDUCTIVE FLUORORESIN-BASED | NON-CONDUCTIVE FLUORORESIN-BASED | NON-CONDUCTIVE FLUORORESIN-BASED | | |
| | THICKNESS (μm) | 2 | 2 | 2 | 10 | | |
| | MATERIAL | NON-CONDUCTIVE SILICONE RUBBER-BASED | | | | NON-CONDUCTIVE SILICONE RUBBER-BASED | NON-CONDUCTIVE FLUORO RUBBER-BASED |
| | THICKNESS (μm) | 15 | | | | 15 | 15 |
| SURFACE LAYER 16 | MATERIAL | ION-CONDUCTIVE PFA | ION-CONDUCTIVE PFA | ION-CONDUCTIVE PFA | ION-CONDUCTIVE PFA | ION-CONDUCTIVE PFA | ION-CONDUCTIVE PFA |
| | THICKNESS (μm) | 30 | 30 | 30 | 30 | 30 | 30 |
| ELECTROSTATIC CAPACITY C (pF) | | 37.67 | 37.80 | 36.10 | 37.01 | 36.60 | 36.54 |
| ELECTROSTATIC CAPACITY PER UNIT AREA C/A (pF/cm²) | | 8.33 | 8.35 | 7.98 | 8.18 | 8.09 | 7.86 |
| ELECTRICAL RESISTANCE R (Ω) | | $1.47 \times 10^8$ | $1.80 \times 10^8$ | $3.2 \times 10^8$ | $3.3 \times 10^8$ | $1.0 \times 10^9$ | $6.3 \times 10^9$ |
| ELECTRICAL RESISTANCE PER UNIT AREA R/A (Ω/cm²) | | $3.2 \times 10^7$ | $4.0 \times 10^7$ | $7.0 \times 10^7$ | $7.2 \times 10^7$ | $2.2 \times 10^8$ | $1.4 \times 10^9$ |
| DIELECTRIC RELAXATION TIME τ (msec) | | 6 | 7 | 11 | 12 | 36 | 22 |
| C·R/A² (FΩ/cm⁴) | | $2.7 \times 10^{-4}$ | $3.3 \times 10^{-4}$ | $5.6 \times 10^{-4}$ | $5.9 \times 10^{-4}$ | $1.8 \times 10^{-3}$ | $1.1 \times 10^{-3}$ |
| CHARGE DECAY ΔV (kV) | | 0.22 | 0.20 | 0.25 | 0.20 | 0.00 | 0.05 |
| ELECTROSTATIC OFFSET REDUCING EFFECT | | GOOD | GOOD | GOOD | GOOD | GOOD | BAD |

Fig. 13

| LAYER | RUBBER LAYER 14 | INNER LAYER 151 OF ADHESION LAYER 15 | OUTER LAYER 152 OF ADHESION LAYER 15 | ADHESION LAYER 15 | SURFACE LAYER 16 |
|---|---|---|---|---|---|
| MATERIAL | NON-CONDUCTIVE SILICONE RUBBER X-34-2008-2 | NON-CONDUCTIVE FLUORORESIN-BASED PJ-CL990 | NON-CONDUCTIVE SILICONE RUBBER-BASED KE-1880 | NON-CONDUCTIVE FLUORO RUBBER-BASED SIFEL2617 | PFA |
| THICKNESS (μm) | 2000 | 2 | 2000 | 2000 | 30 |
| ELECTRICAL RESISTANCE R(Ω) | $8.4 \times 10^{8}$ | 3.5 | $1.10 \times 10^{9}$ | $5.00 \times 10^{7}$ | $1.00 \times 10^{15}$ |
| IMAGINARY PART OF COMPLEX PERMITTIVITY ε | 3.17 | 9.50 | 2.85 | 2.59 | 2.20 |

FUSER DEVICE

CROSS REFERENCE TO RELATED APPLICATIONS

This application is a U.S. National Phase Application under 35 U.S.C. 371 of International Application No. PCT/JP2019/051384, filed on Dec. 27, 2019, which claims priority to Japanese Patent Application No. 2019-026438, filed on Feb. 18, 2019. The entire disclosure of each of the above applications is expressly incorporated by reference herein.

BACKGROUND

Technical Field

The present invention relates to fuser devices used in fuser apparatuses of an electrographic image forming apparatus.

Related Art

A fuser apparatus of an electrographic forming apparatus (for example, a copying machine or a printer) pressurizes a charged toner on a moving sheet and fixes the toner to the sheet. Accordingly, the fuser apparatus is equipped with a pair of rolls (a fuser roll and a pressure roll) or with a fuser belt and pressure roll. In a fuser of the type with a fuser belt and a pressure roll, toner is permanently bonded to a sheet as the sheet passes through the nip between the fuser belt and the pressure roll (JP-A-2018-136412). In this type, the fuser belt is pressed toward the pressure roll by a fuser roll or fixing pad to fuse the toner by heating. The fuser belt is reheated to a high temperature by a heating device.

In use of a fuser apparatus, it is desirable for toner images to be fixed to sheets without excess or deficiency of toner when the sheets pass through the nip. However, due to generation of static electricity, an excessive amount of toner may be attracted to a sheet, or conversely, toner may be repelled from the sheet. Such a phenomenon, referred to as electrostatic offset, causes a disturbance in an image to be formed.

Measures to reduce electrostatic offset have been attempted, for example, as disclosed in JP-A-2018-136412.

A fuser device deployed after a developing unit for attaching a positively charged toner to a sheet fixes the toner to the sheet. In this fuser device, it is desired to further effectively reduce electrostatic offset.

SUMMARY

The present invention provides a fuser device for fixing a positively charged toner image to a sheet, which can effectively reduce electrostatic offset.

A fuser device according to an aspect of the present invention is a tubular fuser device that rotates and is in contact with a sheet on which a positively charged toner image is formed to fix the toner image to the sheet. The fuser device includes a tubular substrate made of a metal, a rubber layer covering an outer periphery of the substrate, an adhesion layer covering an outer periphery of the rubber layer, and a surface layer made of a resin covering an outer periphery of the adhesion layer. $C \cdot R/A^2$ is less than $1.1 \times 10^{-3}$ $F\Omega/cm^4$ in which $C \cdot R/A^2$ is a product of an electrostatic capacity per unit area $C/A$ in a thickness direction of the fuser device and an electrical resistance per unit area $R/A$ in the thickness direction of the fuser device.

In this aspect, since the dielectric relaxation time is sufficiently short, after removal of the electric field, a high polarization state rapidly changes to a low polarization state, and it is possible to effectively reduce the electrostatic offset.

BRIEF DESCRIPTION OF THE DRAWINGS

FIG. 12 is a table showing factors of various samples of the fuser device;

FIG. 13 is a table showing electrical features of some layers of the fuser device;

DETAILED DESCRIPTION

Hereinafter, an embodiment according to the present invention will be described with reference to the accompanying drawings. It is of note that the drawings are not necessarily to scale, and certain features may be depicted in exaggerated form or may be omitted.

An electrographic forming apparatus forms an image of toner (toner image) on a sheet of paper that is a transported recording medium. Although details of the image forming apparatus are not shown, the image forming apparatus includes a photoconductor drum, a charger, an exposure unit, a developer, a transfer unit, and a fuser apparatus. The charger, the exposure unit, the developer, the transfer unit, and the fuser apparatus are disposed around the photoconductor drum. In this embodiment, the toner is positively charged, so that the toner attaches to the sheet, which is conveyed to the fuser apparatus.

Figure 1:
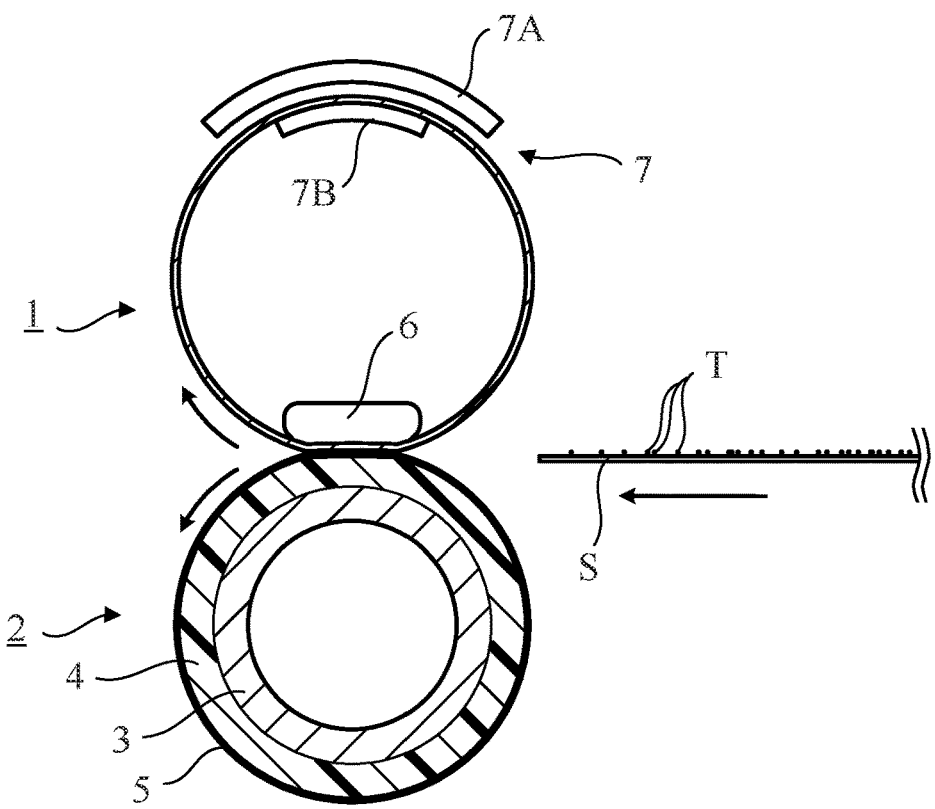
FIG. 1 is a schematic cross-sectional view showing an example of a fuser apparatus including a fuser device according to an embodiment of the present invention.

As shown in FIG. 1, the fuser apparatus has a movable fuser belt (fuser device) 1 and a rotatable pressure roll 2. While the sheet S passes through the nip between the fuser belt 1 and the pressure roll 2, toner particles T are fixed to the sheet S. The fuser belt 1 and the pressure roll 2 pressurize the toner particles T on the sheet S. The fuser belt 1 fuses the toner particles T by heating.

The pressure roll 2 includes a core member 3, an elastic layer 4 covering the outer periphery of the core member 3, and a release layer 5 covering the outer periphery of the elastic layer 4.

The core member 3 is a hard round rod. The material of the core member 3 is not limited, but may be, for example, a metal such as iron, aluminum, etc. or a resin material. The core member 3 may be hollow or solid.

The elastic layer 4 is a hollow cylinder mounted to the outer peripheral surface of the core member 3 over the entire circumference, and is formed of a porous elastic material, such as sponge. However, the elastic layer 4 may be formed of a non-porous elastic material.

The release layer 5 is a thin layer mounted to the outer peripheral surface of the elastic layer 4 over the entire circumference, and facilitates separation of the pressure roll 2 from the toner particles T fixed to the sheet P. Although FIG. 1 shows that a toner image is formed on one surface of the sheet P, it is of note that after the toner particles T are fixed to one surface of the sheet P, the toner particles T may be fixed to the other surface of the sheet P. In this case, the toner particles T are brought into contact with the pressure roll 2 in the nip.

The release layer 5 is formed of a synthetic resin material that can be easily separated from the toner particles T. The material of the release layer 5 is preferably a fluororesin. Such a fluororesin is, for example, a perfluoroalkoxyfluororesin (PFA), polytetrafluoroethylene (PTFE), a tetrafluoroethylene-hexafluoropropylene copolymer (FEP), or a tetrafluoroethylene-ethylene copolymer (ETFE).

The fuser belt 1 is a hollow cylinder, and can also be considered as a roll with a cylindrical wall having a small thickness. A fixing pad 6 made of a resin is disposed inside the fuser belt 1. The fixing pad 6 presses the fuser belt 1 against the pressure roll 2 to maintain an appropriate width of the nip between the fuser belt 1 and the pressure roll 2. In the nip, the fuser belt 1 and the pressure roll 2 are slightly deformed under mutual pressure.

In the vicinity of the fuser belt 1, a heater 7 is disposed. The heater 7 reheats the fuser belt 1 cooled as a result of being deprived of heat by the pressure roll 2 at the nip. In the example shown in FIG. 1, the heater 7 has a known electromagnetic induction heater 7A and a magnetic field absorber 7B, in which the electromagnetic induction heater 7A is disposed outside the fuser belt 1 and the magnetic field absorber 7B is disposed inside the fuser belt 1.

However, the type of the heater is not limited to the example shown in FIG. 1. For example, as shown in FIG. 2, a heat generating source such as a halogen heater 8 disposed inside the fuser belt 1 may be used as the heater.

Figure 2:
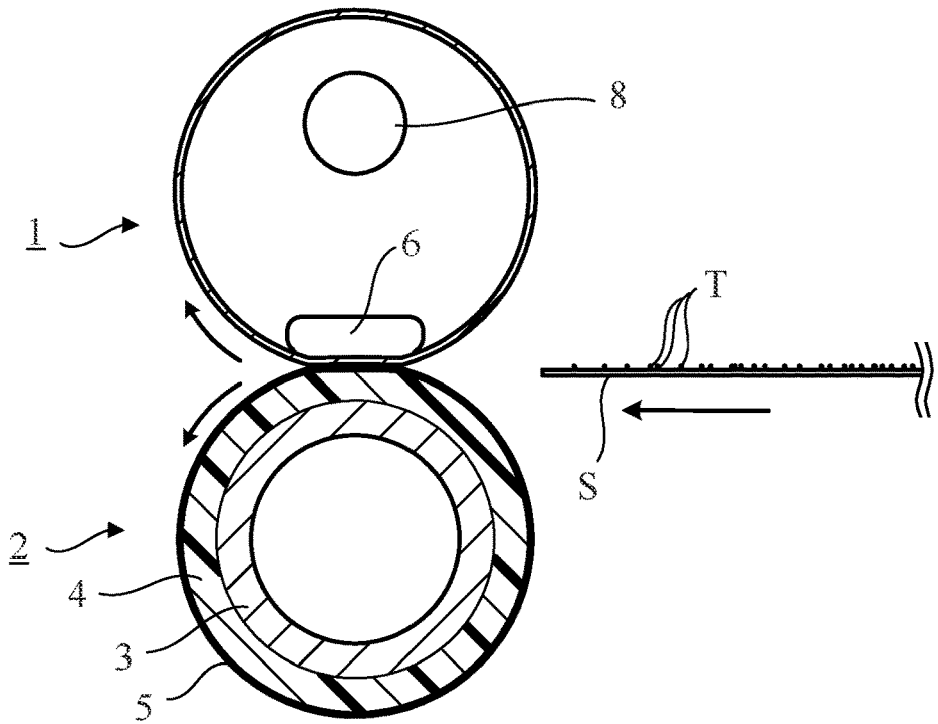
FIG. 2 is a schematic cross-sectional view showing another example of a fuser apparatus including a fuser device according to an embodiment.

In the examples of FIGS. 1 and 2, the fixing pad 6 is used, but a rotatable fuser roll may be disposed inside the fuser belt 1 instead of the fixing pad 6.

Figure 3:
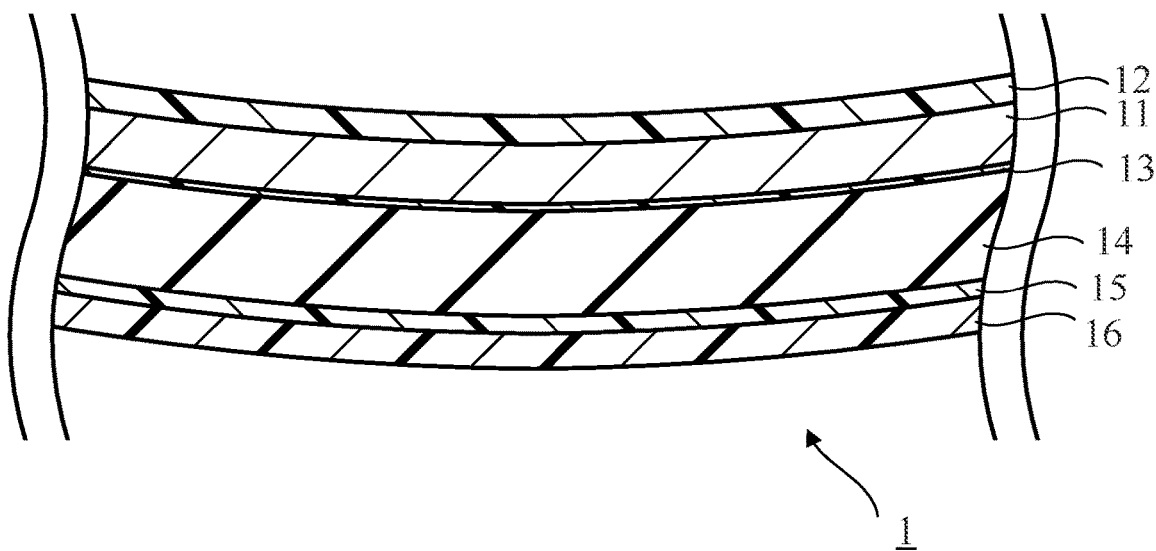
FIG. 3 is a cross-sectional view of a portion of a fuser device according to an embodiment.

As shown in FIG. 3, the fuser belt 1 has a substrate 11, a slide layer 12, a primer layer 13, a rubber layer 14, an adhesion layer 15, and a surface layer 16.

The substrate 11 is a hollow metal cylinder. The material of the substrate 11 may be, for example, nickel or stainless steel. The substrate 11 may be formed by sandwiching a copper layer between one nickel layer and another nickel layer. The substrate 11 ensures rigidity of the fuser belt 1 and enhances thermal conductivity of the fuser belt 1.

The slide layer 12 is a layer of uniform thickness that coats the inner periphery of the substrate 11. The slide layer 12 slidably contacts the fixing pad 6 and/or other components of the fuser apparatus. The slide layer 12 is made of a material having a low coefficient of friction, for example, a fluororesin. A preferred fluororesin is, for example, PTFE, PFA, FEP, or ETFE.

The primer layer 13 is a layer of uniform thickness that covers an outer periphery of the substrate 11. The primer layer 13 has a role in bonding the slide layer 12 and the rubber layer 14. The material of the primer layer 13 may vary depending on the material of the rubber layer 14.

The rubber layer 14 is a layer of uniform thickness that covers an outer periphery of the primer layer 13. The rubber layer 14 is the thickest layer of the fuser belt 1. The rubber layer 14 imparts appropriate elasticity to the fuser belt 1 for fixing the toner particles T. The rubber layer 14 is made of, for example, silicone rubber. In a case in which the rubber layer 14 is made of silicone rubber, it is preferable that the primer layer 13 is made of a silicone rubber-based adhesive.

The adhesion layer 15 is a layer of uniform thickness that covers the outer periphery of the rubber layer 14. The adhesion layer 15 has a role in bonding the rubber layer 14 and the surface layer 16. In this embodiment, the adhesion layer 15 is a single layer made of a fluororesin-based adhesive. However, the adhesion layer 15 may be made of, for example, a silicone rubber-based adhesive or a fluoro rubber-based adhesive.

The surface layer 16 is a layer of uniform thickness that covers the outer periphery of the adhesion layer 15. The surface layer 16 facilitates separation of the fuser belt 1 from the toner particles T fixed to sheets P. The surface layer 16 is made of a synthetic resin material that can be easily separated from the toner particles T. The material of the surface layer 16 is preferably a fluororesin. A preferred fluororesin is, for example, PFA, PTFE, FEP, or ETFE.

Figure 4:
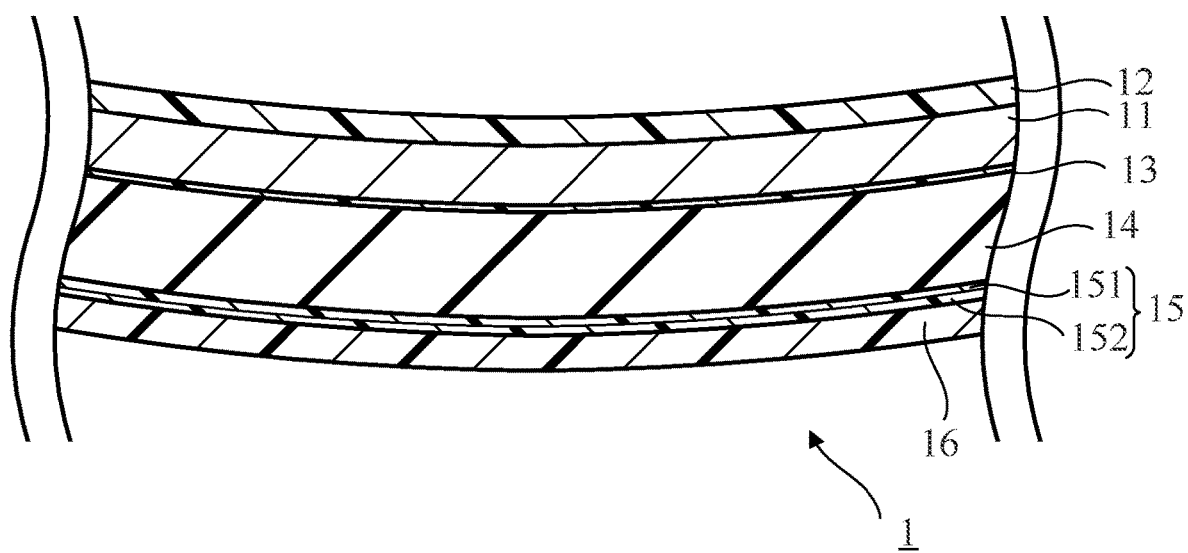
FIG. 4 is a cross-sectional view of a portion of a fuser device according to another embodiment.

FIG. 4 shows a fuser belt 1 according to another embodiment. In the fuser belt 1, the adhesive layer 15 is composed of two layers, that is, an inner layer 151 and an outer layer 152. Other features are the same as the previously mentioned fuser belt 1.

The inner layer 151 is closely adhered to the outer peripheral surface of the rubber layer 14, whereas the outer layer 152 is interposed between the inner layer 151 and the surface layer 16. Consequently, the outer layer 152 is closely adhered to the outer peripheral surface of the inner layer 151, and is closely adhered to the inner peripheral surface of the surface layer 16. The inner layer 151 is made of a fluororesin-based adhesive, whereas the outer layer 152 is made of a non-conductive silicone rubber-based adhesive.

In the embodiments shown in FIGS. 3 and 4, other layers may be interposed between the above-mentioned layers.

Hereinafter, a method of manufacturing the fuser belt 1 will be described. The method described below relates to the fuser belt 1 with an adhesion layer 15 constituted of a single layer.

Figure 5:
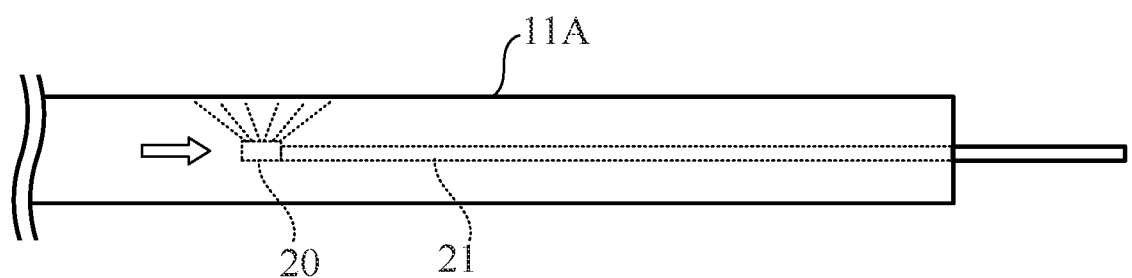
FIG. 5 is a schematic diagram showing a step of manufacturing the fuser device according to the embodiment.

First, as shown in FIG. 5, a metal tube 11A shaped as a hollow cylinder is prepared. The metal tube 11A corresponds to the substrate 11 in the fuser belt 1 (finished product), but has a length several times that of the fuser belt 1 of the finished product. The metal tube 11A can be manufactured, for example, by electroforming.

Next, as shown in FIG. 5, a spray nozzle 20 is inserted into the interior of the metal tube 11A, and while moving the spray nozzle 20, the material of the slide layer 12 is supplied to the spray nozzle 20 via a tube 21, and the spray nozzle 20 sprays the material of the slide layer 12. Thereafter, the material is cured by heating to form a slide layer 12.

Figure 6:
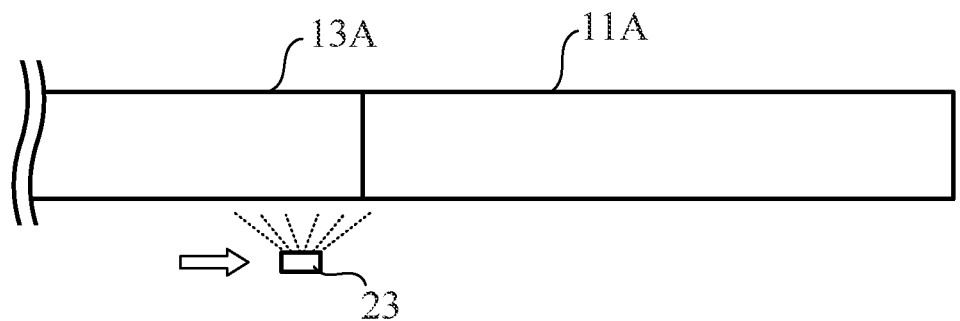
FIG. 6 is a schematic diagram showing a step after the step of FIG. 5.

Next, as shown in FIG. 6, while moving another spray nozzle 23, the material 13A of the primer layer 13 is sprayed onto the outer peripheral surface of the metal tube 11A from the spray nozzle 23. Thereafter, the primer layer 13 is formed by heating to dry the material 13A.

Figure 7:
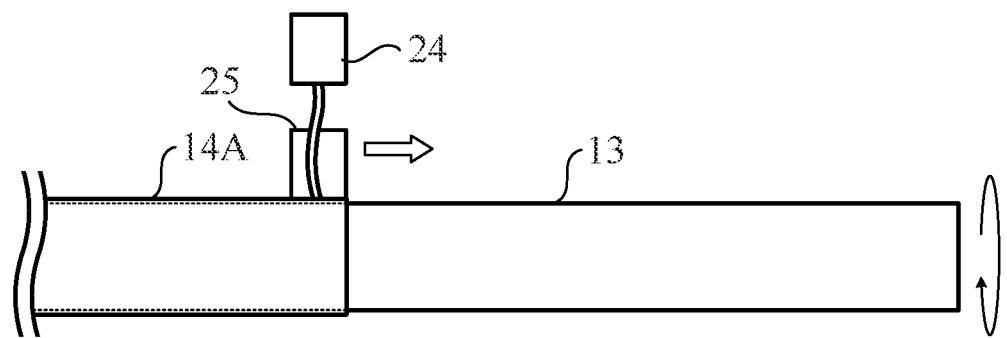
FIG. 7 is a schematic diagram showing a step after the step of FIG. 6.

Next, as shown in FIG. 7, the metal tube 11A is rotated about the axis thereof, and while the material 14A of the rubber layer 14 is supplied to the outer peripheral surface of the primer layer 13 by a rubber supply device 24, the material 14A of the rubber layer 14 is leveled evenly (to have a uniform thickness) by a blade 25 with a straight tip end. In this way, the surface of the primer layer 13 is coated with the material of the rubber layer 14. Thereafter, the rubber layer 14 is formed by heating to cure the material 14A.

If the adhesion layer 15 is made of a fluororesin-based adhesive, the material of the adhesive layer 15 is then sprayed onto the outer peripheral surface of the rubber layer 14 by the spray nozzle while moving the spray nozzle as in a similar manner shown in FIG. 6.

Figure 8:
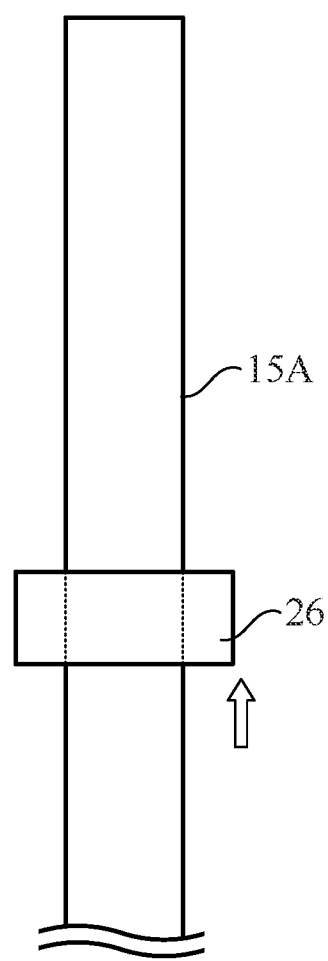
FIG. 8 is a schematic diagram showing a step after the step of FIG. 7.

On the other hand, if the adhesion layer 15 is made of a silicone rubber-based adhesive or a fluoro rubber-based adhesive, as shown in FIG. 8, the material 15A of the adhesion layer 15 is applied around the rubber layer 14, and the metal tube 11A is inserted into a ring 26. By moving the ring 26 along the axial direction of the metal tube 11A, the material 15A is leveled evenly (to have a uniform thickness) by the inner peripheral surface of the ring 26.

Figure 9:
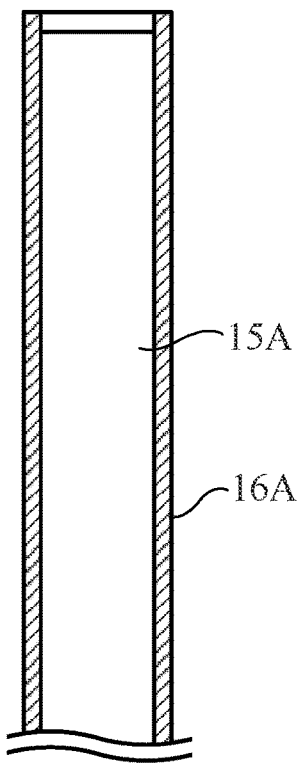
FIG. 9 is a schematic diagram showing a step after the step of FIG. 8.

Next, as shown in FIG. 9, a tube 16A is placed around the material 15A of the adhesion layer 15. In other words, the metal tube 11A is inserted into the tube 16A. The tube 16A corresponds to the surface layer 16 in the fuser belt 1 (finished product), but has a length several times that of the fuser belt 1 of the finished product.

Figure 10:
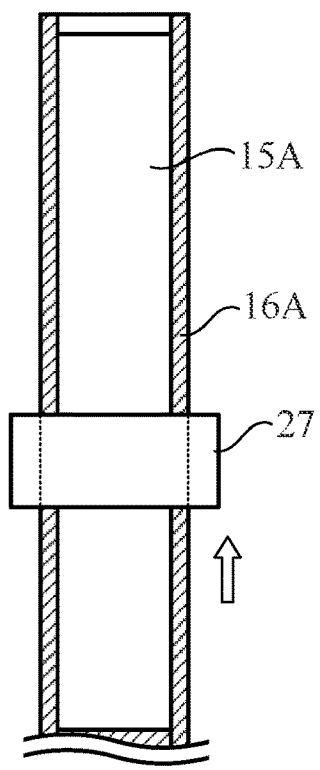
FIG. 10 is a schematic diagram showing a step after the step of FIG. 9.

Next, as shown in FIG. 10, the metal tube 11A is inserted into a ring 27 together with the tube 16A. By moving the ring 27 along the axial direction of the metal tube 11A, the tube 16A is pressed radially inward by the inner peripheral surface of the ring 27, thereby enhancing adhesion of the material 15A of the adhesion layer 15 and the tube 16A. In FIGS. 8 and 9, only the tube 16A is shown in a cross section. Thereafter, the material 15A is heated and cured, so that the adhesion layer 15 is formed, and (at the same time) the adhesion layer 15 and the tube 16A are fixed.

Figure 11:
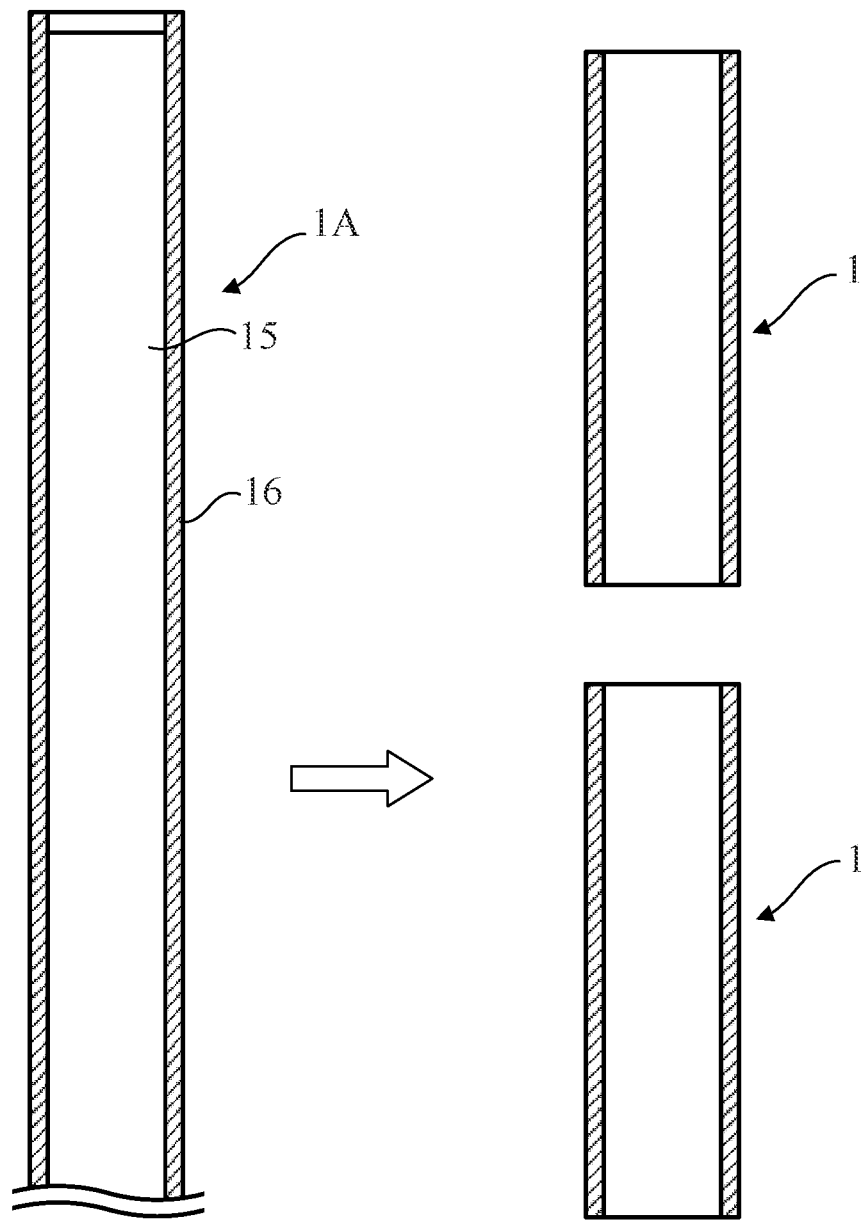
FIG. 11 is a schematic diagram showing a step after the step of FIG. 10.

In this manner, the long hollow cylinder 1A shown in FIG. 11 is obtained. Then, as shown in FIG. 11, by cutting the hollow cylinder 1A in a direction perpendicular to the axial direction, fuser belts 1 are obtained as finished products.

If a fuser belt 1 with the adhesion layer 15 composed of two layers (see FIG. 4) is manufactured, the material of the inner layer 151 (fluororesin-based adhesive) of the adhesive layer 15 may be applied around the rubber layer 14 with a moving spray nozzle. Then, the material of the outer layer 152 (non-conductive silicone rubber-based adhesive) may be applied therearound, and then, the material may be leveled evenly by a ring in the same manner as in FIG. 8.

The applicant produced samples of different materials and thicknesses of several layers of the fuser belt 1, measured electrical properties of samples, and investigated whether each sample effectively reduced electrostatic offset. Factors of the samples are shown in FIG. 12.

For each sample, the substrate 11, the slide layer 12, and the primer layer 13 were common. Specifically, the substrate 11 was a seamless hollow nickel cylinder manufactured by use of electroforming, having a diameter of 40 mm and a thickness of 40 μm. The slide layer 12 was formed of PTFE and had a thickness of 12 μm.

The primer layer 13 was manufactured from "DY 39-042" manufactured by Dow Corning Toray Co., Ltd. (Tokyo, Japan), which is a non-conductive silicone rubber-based adhesive. As described above, the material 13A of the primer layer 13 was applied on the metal tube 11A by a spray nozzle 20, and heated at 150 degrees Celsius for 1 minute to dry the material 13A, thereby forming a primer layer 13. The thickness of the primer layer 13 was 2 μm.

The rubber layer 14 was manufactured from "X-34-2008-2" manufactured by Shin-Etsu Chemical Co., Ltd. (Tokyo, Japan), which is a non-conductive silicone rubber. As described above, the material 14A of the rubber layer 14 was leveled by the blade 25 and cured by heating at 150 degrees Celsius.

The thickness of the rubber layer 14 in each sample was as shown in FIG. 12. The thickness of the rubber layer 14 of sample 3 was made different from that of other samples in order to examine differences in electrical characteristics caused by differences in thickness of the rubber layer 14. For sample 3, the thickness of the rubber layer 14 was 300 μm, whereas the that for the other samples was 285 μm. In the fuser belt 1, the layers other than the substrate 11 are basically formed using dielectrics, unless it is specified that a conductor is used as in FIG. 12. The electrostatic capacity between the substrate 11 and the surface of the surface layer 16 in the fuser belt 1 can be considered as an index representing ease of charging the fuser belt 1. The electrostatic capacity becomes smaller as the thickness of the dielectrics between the substrate 11 and the surface of the surface layer 16 becomes greater. The applicant considered that the smaller the electrostatic capacity, the lesser the charging on the surface of the surface layer 16, which is close to the toner particles T, and the lesser the electrostatic offset.

For sample 1, the adhesive layer 15 had a two-layer structure having an inner layer 151 and an outer layer 152. The inner layer 151 was manufactured from "PJ-CL990" manufactured by The Chemours Company (Delaware, USA), which is a non-conductive fluororesin-based adhesive having a low electrical resistance. The thickness of the inner layer 151 was 2 μm. The outer layer 152 was manufactured from "KE-1880" manufactured by Shin-Etsu Chemical Co., Ltd., which is a non-conductive silicone rubber-based adhesive. The thickness of the outer layer 152 was 15 μm. In the production of sample 1, the material of the inner layer 151 of the adhesive layer 15 was applied around the rubber layer 14, and the material was leveled evenly with a ring. The material was heated at 100 degrees Celsius for 5 minutes so that the inner layer 151 was dried. Furthermore, the material of the outer layer 152 was applied around the inner layer 151, and the material was leveled evenly with a ring.

For Samples 2 to 4, the adhesive layer 15 was a single layer manufactured from "PJ-CL990" manufactured by The Chemours Company, which is a non-conductive fluororesin-based adhesive.

For sample 5, the adhesion layer 15 was a single layer manufactured from "KE-1880" manufactured by Shin-Etsu Chemical Co., Ltd., which is a non-conductive silicone rubber-based adhesive.

For sample 6, the adhesion layer 15 was a single layer manufactured from "SIFEL2617" manufactured by Shin-Etsu Chemical Co., Ltd., which is a non-conductive fluoro rubber-based adhesive.

In manufacturing samples 2 to 6, the material of the adhesion layer 15 was applied to the periphery of the rubber layer 14, and the material was leveled evenly with a ring. The thickness of the adhesion layer 15 in each sample was as shown in FIG. 12.

Although the material 15 of the inner layer 151 of sample 1 and the material of the adhesion layer 15 of samples 2 to 4 are in an emulsion state, it is considered that the cured inner layer 151 of sample 1 and the cured adhesion layer 15 of samples 2 to 4 contain fluorine of high purity.

The reason for the variation in the material of the adhesion layer 15 depending on the sample was to examine the difference in electrical characteristics caused by the difference in the material of the adhesion layer 15. The applicant expected that, for samples 1-4 and 6, the presence of fluorine, which has a high electronegativity (strong force to attract electrons), between the substrate 11 and the surface of the surface layer 16 in the fuser belt 1 reduces charging on the surface of the surface layer 16, which is adjacent to the toner particles T, thereby reducing electrostatic offset. The electronegativity of fluorine is 3.98 and the largest among all atoms, whereas the electronegativity of silicon, which is the main component of silicone rubber, is 1.90.

The applicant also thought that the electrical resistance of the fuser belt 1 in the thickness direction thereof is related to the electrostatic offset. The applicant considered that electrostatic offset can be reduced if the surface layer 16 rapidly changes from a high polarization state to a low polarization state (dielectric relaxation state) after removal of the electric field applied to the fuser belt 1. In other words, it is desirable that the dielectric relaxation time T be small. According to TAKEUCHI, Manabu, "influence of Atmospheric Conditions on Turbocharging of Toners", Journal of the Imaging Society of Japan, Vol. 39, No. 3, 2000, pp. 270-277, the dielectric relaxation time T can be calculated by the following equation.

$$\tau = CR \qquad \text{(Equation 1)}$$

where C is the electrostatic capacity in the thickness direction of the fuser belt 1, and R is the electrical resistance in the thickness direction of the fuser belt 1.

The electrostatic capacity C can be calculated by the following equation.

$$C = \varepsilon s./d \qquad \text{(Equation 2)}$$

where $\varepsilon$ is the imaginary part of the complex permittivity of the fuser belt 1, S is the area, and d is the thickness.

From Equation 1, it is desirable that the electrostatic capacity C and/or the electrical resistance R be small. FIG. 13 shows electrical properties of the material of each layer. Methods for measuring the electrical properties will be described later. The applicant thought that by using a non-conductive fluororesin-based adhesive ("PJ-CL990") with low electrical resistance for the adhesive layer 15, the dielectric relaxation time T can be shortened and electrostatic offset can be reduced. Accordingly, the applicant expected that electrostatic offset could be reduced in samples 1 to 4, in which the adhesive layer 15 contains a fluororesin.

For each sample, the surface layer 16 was produced from a tube made of PFA with a thickness of 30 µm.

The characteristics of each sample are summarized as follows.

Sample 1 is characterized in that the adhesion layer 15 includes the inner layer 151 made of a non-conductive fluororesin-based material and the outer layer 152 made of a non-conductive silicone rubber-based material.

Samples 2, 3, and 4 are characterized in that the adhesion layer 15 is a single layer made of a non-conductive fluororesin-based material. Sample 2 is characterized in that the thickness of the adhesive layer 15 is less than that of the samples 3 and 4. Samples 3 and 4 are characterized in that the thickness of the adhesive layer 15 is greater than that of sample 2, and sample 4 is characterized in that the thickness of the rubber layer 14 is greater than that of the other samples.

Sample 5 is characterized in that the adhesive layer 15 is a single layer formed of a non-conductive silicone rubber-based material.

Sample 6 is characterized in that the adhesive layer 15 is a single layer formed of a non-conductive fluoro rubber-based material.

Figure 14:
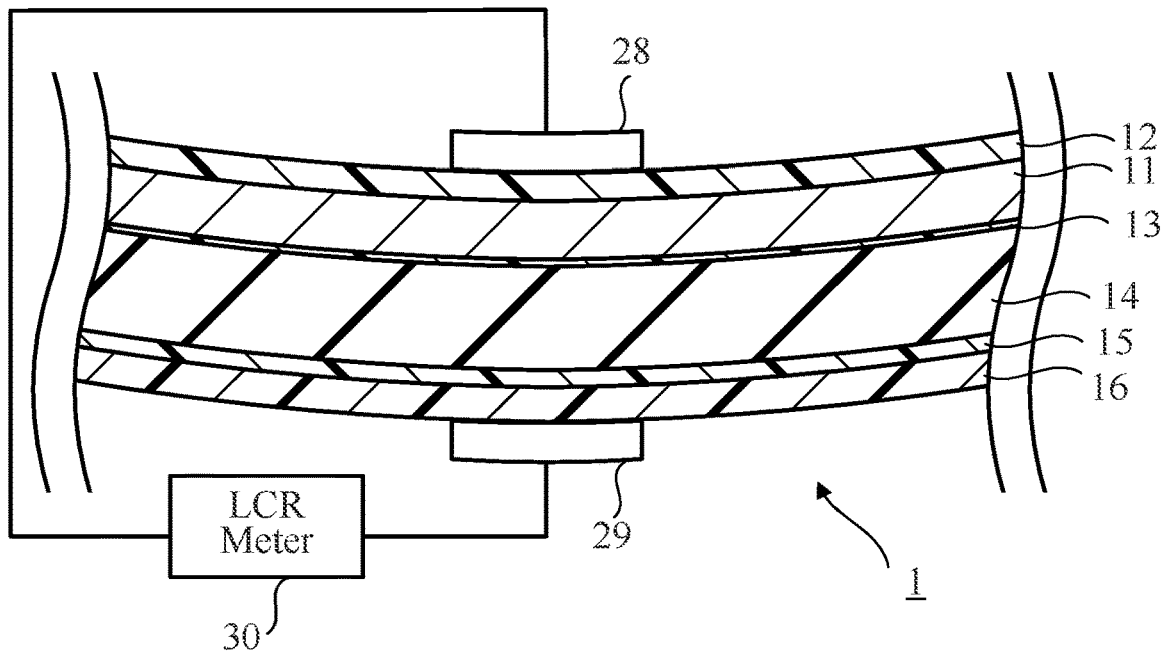
FIG. 14 is a schematic diagram showing a method of measuring the electrical resistance and the electrostatic capacity in the thickness direction of the fuser device according to an embodiment.

For each sample, the electrical resistance R ($\Omega$) and the electrostatic capacity C (pF) in the thickness direction of the fuser belt 1 were measured in the manner depicted in FIG. 14. The manner depicted is two-terminal sensing, in which two electrodes 28 and 29 are brought into contact with the inner peripheral surface of the fuser belt 1 (the surface of the slide layer 12) and the outer peripheral surface of the fuser belt 1 (the surface of the surface layer 16), respectively, to measure the electrical resistance R and the electrostatic capacity with an LCR meter 30. The LCR meter 30 used was "3522-50" manufactured by Hikoi E.E. Corporation (Nagano, Japan). The frequency used for the measurement was 1 kHz. Furthermore, for general considerations, the measured electrical resistance was divided by the area A of the electrodes 28 and 29 (contact area to the fuser belt 1, i.e., 4.524 cm$^2$) to calculate the electrical resistance per unit area R/A in the thickness direction of the fuser belt 1. Furthermore, for general considerations, the measured electrostatic capacity was divided by the area of the electrodes 28 and 29 (contact area to the fuser belt 1) to calculate the electrostatic capacity per unit area C/A in the thickness direction of the fuser belt 1. FIG. 12 show the electrical resistance per unit area R/A (Q/cm$^2$) and the electrostatic capacity per unit area C/A (pF/cm$^2$) in the thickness direction of the fuser belt 1.

The electrical resistances R of the layer materials shown in FIG. 13 were obtained by separately manufacturing films from the materials and by measuring the electrical resistance of each film in the same manner as described above. The thickness of each film used for the measurement is shown in FIG. 13. The imaginary part $\varepsilon$ of the complex permittivity of each layer material shown in FIG. 13 was calculated according to Equation 2 after measuring the electrostatic capacity C of the film in the same method as described above (in this case, S is the area of the electrodes 28 and 29, and d is the thickness of the film).

Figure 15:
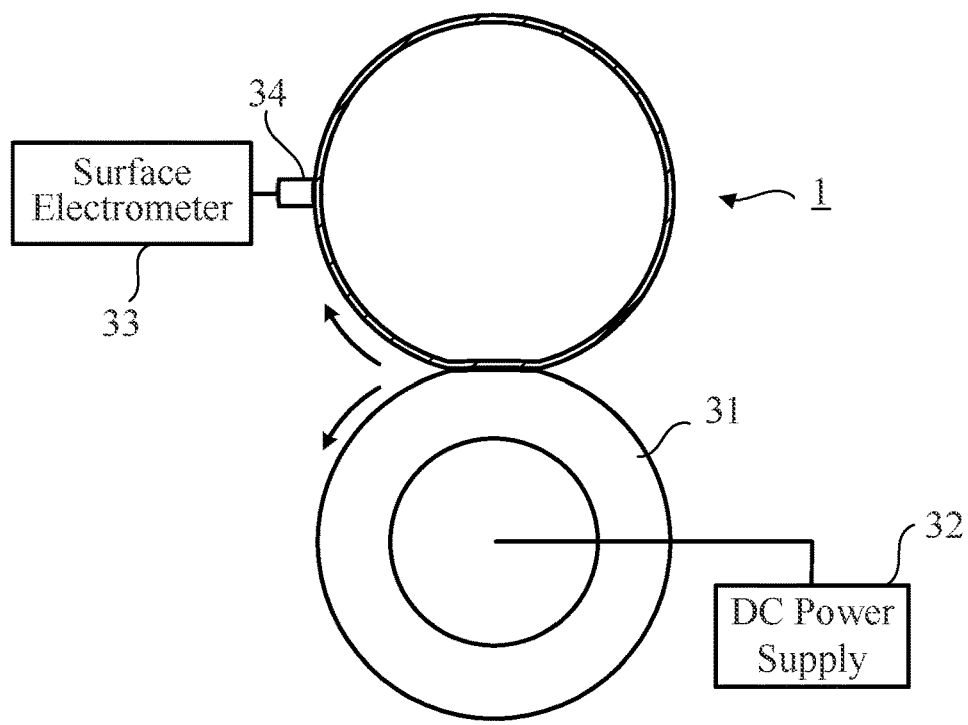
FIG. 15 is a schematic diagram showing a method of measuring the charge decay on the surface layer of the fuser device according to the embodiment.

Furthermore, for each sample, the amount of charge decay $\Delta V$ (kV) in the surface layer 16 was measured in the manner depicted in FIG. 15. In this measurement, under an environment in which the temperature was 23 degrees Celsius and the relative wetness was 55%, a charging roll 31 was brought into contact with the fuser belt 1, the fuser belt 1 was revolved at 60 rpm, and charges were supplied from the DC (direct current) power supply 32 to the fuser belt 1 via the charging roll 31. The resistance of the charging roll 31 was 5×10$^6$$\Omega$. The DC power supply 32 was "610C" manufactured by Trek, Inc. (New York, USA).

The probe 34 of a surface electrometer 33 was brought into proximity with the outer peripheral surface of the fuser belt 1 (surface of the surface layer 16) to measure the surface potential. The proximity position of the probe 34 to the fuser belt 1 was 90 degrees away from the position at which the charging roll 31 was in contact with the fuser belt 1. The surface electrometer 33 was "Model 244A" of Monroe Electronics, Inc. (New York, USA), and the probe was a standard probe "1017A" attached to "Model 244A."

Under the above conditions, the surface potential of the surface layer 16 was monitored by the surface electrometer 33, and the surface of the surface layer was maintained to be charged to −1 kV for 60 seconds. Thereafter, the charging roll 31 was separated from the fuser belt 1, thereby finishing the charging. 120 seconds after end of charging, charge decay ΔV (kV) of the surface of the surface layer 16 was measured. Charge decay ΔV is an index representing the difficulty of charging of the fuser belt 1. The measured charge decay ΔV is shown in FIG. 12.

In addition, the dielectric relaxation time T, which is the product of the electrostatic capacity C in the thickness direction of the fuser belt 1 and the electric resistance R in the thickness direction of the fuser belt 1, was calculated in accordance with Equation 1. The calculated dielectric relaxation time T (msec) is also shown in FIG. 12. The unit, msec, in FIG. 12 can be replaced with another unit, mF·Ω.

Furthermore, for general considerations, $C \cdot R/A^2$ (FΩ/cm$^4$) was calculated, which is the product of the electrostatic capacity per unit area C/A (pF/cm$^2$) and the electrical resistance per unit area R/A (Ω/cm$^2$) of the fuser belt 1 in the thickness direction. The unit, FΩ/cm$^4$, in FIG. 12 can be replaced with another unit, sec/cm$^4$.

Each sample was mounted to an image forming apparatus, and the effect for reducing electrostatic offset of each sample was evaluated. The image forming apparatus used was "TASKalfa 5550ci" manufactured by Kyocera Document Solutions Inc. (Osaka, Japan). In this assessment, a white solid image was printed on sheets of paper, and the L* value (lightness) were measured at seven spots in the image with the use of a color difference meter (chroma meter, "CR-400" manufactured by Konica Minolta, Inc. (Tokyo, Japan)) in order to determine whether fogging (printing on a non-print area) occurred. It was evaluated that in a case in which the L* value was 95.5 or more, fogging did not exist or was negligible, and the electrostatic offset reducing effect was good. It was evaluated that in a case in which the L* value was less than 95.5, fogging was not negligible and the electrostatic offset reducing effect was poor.

The evaluation results are shown in FIG. 12. The electrostatic offset reducing effect was good for samples 1 to 4, whereas the electrostatic offset reducing effect was poor for samples 5 and 6.

Therefore, it was found that in a case in which the dielectric relaxation time τ, which is the product of the electrostatic capacity C in the thickness direction of the fuser belt 1 and the electric resistance R in the thickness direction of the fuser belt 1, is less than 22 msec (in a case in which $C \cdot R/A^2$ is less than $1.1 \times 10^{-3}$ FΩ/cm$^4$ in which $C \cdot R/A^2$ is the product of the electrostatic capacity per unit area C/A in the thickness direction of the fuser device and the electrical resistance per unit area R/A in the thickness direction of the fuser device), electrostatic offset can be reduced effectively. As is clear from FIG. 12, the electrostatic capacity C is almost the same for samples 1 to 6, but samples 5 and 6, in which the adhesive layer 15 contains the silicone rubber and the fluoro rubber having higher electric resistance, have a higher electric resistance R than those of samples 1 to 4, in which the adhesive layer 15 contains the fluororesin with a lower electric resistance. Accordingly, each of samples 5 and 6 needs a longer dielectric relaxation time τ. Therefore, it was found that the electrostatic offset can be effectively reduced in a case in which the adhesive layer 15 contains a fluororesin, more specifically, a non-conductive fluororesin. Preferably, the electric resistance R of the fuser belt 1 in the thickness direction is equal to or less than $3.3 \times 10^8$ Ω (and thus, the electric resistance per unit area R/A of the fuser belt 1 in the thickness direction is preferably equal to or less than $7.2 \times 10^7$ Ω/cm$^2$).

For sample 3, in which the thickness of the rubber layer 14 was larger, the electrostatic capacity C was less and the dielectric relaxation time τ was shorter in comparison with sample 4. The reason will be that the thickness of the rubber layer 14 is larger.

For sample 2, in which the thickness of the adhesive layer 15 was smaller, the electrical resistance R was less and the dielectric relaxation time T was shorter in comparison with sample 4. The reason will be that the thickness of the adhesive layer 15 is less.

For sample 1 having a double-layered adhesive layers 15, the electrical resistance R was less and the dielectric relaxation time T was shorter in comparison with sample 2.

Furthermore, as is apparent from the evaluation results, it is preferable a charge decay ΔV at a moment 120 seconds after end of charging a surface of the surface layer 16 to −1 kV be equal to or greater than 0.20 kV and be equal to or less than 0.25 kV. It can be understood that in a case in which the charge decay effect is high, the dielectric relaxation time T may be shortened, so that even if the surface of the adhesive layer 15 is charged, electrostatic offset can be reduced.

The present invention has been shown and described with references to preferred embodiments thereof. However, it will be understood by those skilled in the art that various changes in form and details may be made therein without departing from the scope of the invention as defined by the claims. Such variations, alterations, and modifications are intended to be encompassed in the scope of the present invention.

For example, the slide layer 12 is not essential.

Aspects of the present invention are also set out in the following numbered clauses:

Clause 1. A tubular fuser device that rotates and is in contact with a sheet on which a positively charged toner image is formed to fix the toner image to the sheet, the fuser device comprising:

a tubular substrate made of a metal;

a rubber layer covering an outer periphery of the substrate;

an adhesion layer covering an outer periphery of the rubber layer; and a surface layer made of a resin covering an outer periphery of the adhesion layer, wherein $C \cdot R/A^2$ is less than $1.1 \times 10^{-3}$ FΩ/cm$^4$ in which $C \cdot R/A^2$ is a product of an electrostatic capacity per unit area C/A in a thickness direction of the fuser device and an electrical resistance per unit area R/A in the thickness direction of the fuser device.

Clause 2. The fuser device according to clause 1, wherein the electric resistance per unit area R/A in the thickness direction of the fuser device is equal to or less than $7.2 \times 10^7$ Ω/cm$^2$.

Clause 3. The fuser device according to clause 1 or 2, wherein the adhesion layer comprises a fluororesin.

Clause 4. The fuser device according to clause 1 or 2, wherein the adhesion layer comprises a non-conductive fluororesin.

Clause 5. The fuser device according to clause 3 or 4, wherein the adhesion layer is a single layer made of a fluororesin-based adhesive.

Clause 6. The fuser device according to clause 3 or 4, wherein the adhesion layer comprises an inner layer made of a fluororesin-based adhesive that is closely adhered to an outer periphery surface of the rubber layer, and an outer layer made of a non-conductive silicone rubber-based adhesive that is closely adhered to an outer periphery surface of the inner layer and is closely adhered to an inner periphery surface of the surface layer.

Clause 7. The fuser device according to any one of clauses 1 to 6, wherein a charge decay $\Delta V$ at a moment 120 seconds after end of charging a surface of the surface layer to $-1$ kV is equal to or greater than 0.20 kV and is equal to or less than 0.25 kV.

Clause 8. The fuser device according to any one of clauses 1 to 7, wherein the surface layer is made of an insulative perfluoroalkoxyfluororesin.

Clause 9. The fuser device according to any one of clauses 1 to 8, wherein the rubber layer is made of a non-conductive silicone rubber.

The invention claimed is:

1. A tubular fuser device that rotates and is in contact with a sheet on which a positively charged toner image is formed to fix the toner image to the sheet, the fuser device comprising:
  a tubular substrate made of a metal;
  a rubber layer covering an outer periphery of the substrate;
  an adhesion layer covering an outer periphery of the rubber layer; and
  a surface layer made of a resin covering an outer periphery of the adhesion layer, wherein $C \cdot R/A^2$ is less than $1.1 \times 10^{-3}$ F$\Omega$/cm$^4$ in which $C \cdot R/A^2$ is a product of an electrostatic capacity per unit area $C/A$ in a thickness direction of the fuser device and an electrical resistance per unit area $R/A$ in the thickness direction of the fuser device.

2. The fuser device according to claim 1, wherein the electric resistance per unit area $R/A$ in the thickness direction of the fuser device is equal to or less than $7.2 \times 10^7 \Omega$/cm$^2$.

3. The fuser device according to claim 1, wherein the adhesion layer comprises a fluororesin.

4. The fuser device according to claim 3, wherein the adhesion layer is a single layer made of a fluororesin-based adhesive.

5. The fuser device according to claim 3, wherein the adhesion layer comprises an inner layer made of a fluororesin-based adhesive that is closely adhered to an outer periphery surface of the rubber layer, and an outer layer made of a non-conductive silicone rubber-based adhesive that is closely adhered to an outer periphery surface of the inner layer and is closely adhered to an inner periphery surface of the surface layer.

6. The fuser device according to claim 1, wherein the adhesion layer comprises a non-conductive fluororesin.

7. The fuser device according to claim 1, wherein a charge decay $\Delta V$ at a moment 120 seconds after end of charging a surface of the surface layer to $-1$ kV is equal to or greater than 0.20 kV and is equal to or less than 0.25 kV.

8. The fuser device according to claim 1, wherein the surface layer is made of an insulative perfluoroalkoxyfluororesin.

9. The fuser device according to claim 1, wherein the rubber layer is made of a non-conductive silicone rubber.

* * * * *